United States Patent
Hafenrichter et al.

(10) Patent No.: US 11,697,250 B2
(45) Date of Patent: Jul. 11, 2023

(54) SYSTEMS AND METHODS FOR JOINING A FIRST STRUCTURE AND A SECOND STRUCTURE WITH VACUUM DISPERSION PROCESS

(71) Applicant: The Boeing Company, Chicago, IL (US)

(72) Inventors: Joseph L. Hafenrichter, Chicago, IL (US); Gary E. Georgeson, Chicago, IL (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/502,263

(22) Filed: Oct. 15, 2021

(65) Prior Publication Data

US 2022/0194021 A1    Jun. 23, 2022

Related U.S. Application Data

(60) Provisional application No. 63/126,625, filed on Dec. 17, 2020.

(51) Int. Cl.
| | | |
|---|---|---|
| *B29C 65/54* | (2006.01) | |
| *B29C 65/14* | (2006.01) | |
| *B29C 65/48* | (2006.01) | |
| *B29C 65/50* | (2006.01) | |
| B29L 31/30 | (2006.01) | |

(52) U.S. Cl.
CPC ........ *B29C 65/544* (2013.01); *B29C 65/1448* (2013.01); *B29C 65/4835* (2013.01); *B29C 65/5057* (2013.01); *B29L 2031/3085* (2013.01)

(58) Field of Classification Search
CPC ............ B29C 65/5444; B29C 65/1448; B29C 65/4835; B29C 65/48
See application file for complete search history.

(56) References Cited

U.S. PATENT DOCUMENTS

| | | | | |
|---|---|---|---|---|
| 3,880,331 A | * | 4/1975 | Perkins ................. | B05C 17/015 222/327 |
| 5,833,795 A | * | 11/1998 | Smith ........................ | C09J 5/06 219/710 |
| 2007/0261787 A1 | * | 11/2007 | Malis .................... | F16B 11/006 156/285 |

FOREIGN PATENT DOCUMENTS

DE          102010006328 A1 *   8/2011   ................ C09J 5/00

* cited by examiner

*Primary Examiner* — Daniel McNally
(74) *Attorney, Agent, or Firm* — McDonnell Boehnen Hulbert & Berghoff LLP

(57) ABSTRACT

An example method of joining a first structure and a second structure is described that includes forming a bond cavity between a first structure and a second structure, placing a semi-permeable breather material at one or more exits of the bond cavity, placing a vacuum bag around the bond cavity and the semi-permeable breather material, evacuating the bond cavity via a vacuum port and forcing adhesive into the bond cavity via an adhesive port while the bond cavity is evacuated, and curing the adhesive via one or more heaters to bond the first structure to the second structure.

20 Claims, 15 Drawing Sheets

SYSTEMS AND METHODS FOR JOINING A FIRST STRUCTURE AND A SECOND STRUCTURE WITH VACUUM DISPERSION PROCESS

CROSS REFERENCE TO RELATED APPLICATION

The present disclosure claims priority to U.S. Provisional Application No. 63/126,625 filed on Dec. 17, 2020, the entire contents of which are herein incorporated by reference.

FIELD

The present disclosure relates generally to forming a bonded structure. In particular, the present disclosure relates to reducing voids in bondlines between a first structure and a second structure and forming a voidfree bondline.

BACKGROUND

Components used in vehicles, such as wings used in aircraft, include several bonded members. For example, exterior surfaces of a wing, and the structures used to provide support for those surfaces, may be constructed in a bonded manner using adhesives to create bondlines.

Currently, bonds for large or complex structures involve resin transfer molding, high tolerance film adhesive, or costly co-cure methods. Further, currently, paste bonds such as those that may be used in pi joints and single shear joints in aircraft, utilize adhesive injection approaches that can create bondlines between the bonded members that have some voids and variation in strength, and accordingly, may be rated with a lower performance capability.

As such, there is a desire for an improved bonding method to produce higher quality bonds in a low cost manner.

SUMMARY

In an example, a method of joining a first structure and a second structure is described. The method comprises forming a bond cavity between a first structure and a second structure, placing a semi-permeable breather material at one or more exits of the bond cavity, placing a vacuum bag around the bond cavity and the semi-permeable breather material, evacuating the bond cavity via a vacuum port and forcing adhesive into the bond cavity via an adhesive port while the bond cavity is evacuated, and curing the adhesive via one or more heaters to bond the first structure to the second structure.

In another example, a bondline joining a first structure and a second structure, is described, made by a process comprising forming a bond cavity between a first structure and a second structure, placing a semi-permeable breather material at one or more exits of the bond cavity, placing a vacuum bag around the bond cavity and the semi-permeable breather material, evacuating the bond cavity via a vacuum port and forcing adhesive into the bond cavity via an adhesive port while the bond cavity is evacuated, and curing the adhesive via one or more heaters to bond the first structure to the second structure and to form the bondline joining the first structure and the second structure.

In still another example, a system for joining a first structure and a second structure is described. The system comprises one or more fixtures forming a bond cavity between a first structure and a second structure via positioning of the first structure relative to the second structure, a semi-permeable breather material positioned at one or more exits of the bond cavity, a vacuum bag positioned around the bond cavity and the semi-permeable breather material, a vacuum port coupled to the vacuum bag for evacuating the bond cavity and forcing adhesive into the bond cavity via an adhesive port while the bond cavity is evacuated, and one or more heaters for curing the adhesive to bond the first structure to the second structure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example systems and methods involve joining a first structure and a second structure to create a void-free bondline between the first structure and the second structure. An example method includes forming a bond cavity between a first structure and a second structure, placing a semi-permeable breather material at one or more exits of the bond cavity, placing a vacuum bag around the bond cavity and the semi-permeable breather material, evacuating the bond cavity via a vacuum port and forcing adhesive into the bond cavity via an adhesive port while the bond cavity is evacuated, and curing the adhesive via one or more heaters to bond the first structure to the second structure.

The example systems and methods can in some instances enable creating high quality, void-free bondlines in bond configurations that are traditionally high in void content, have high variation in strength, and take strength "knockdowns" in performance predictions.

Figure 1:
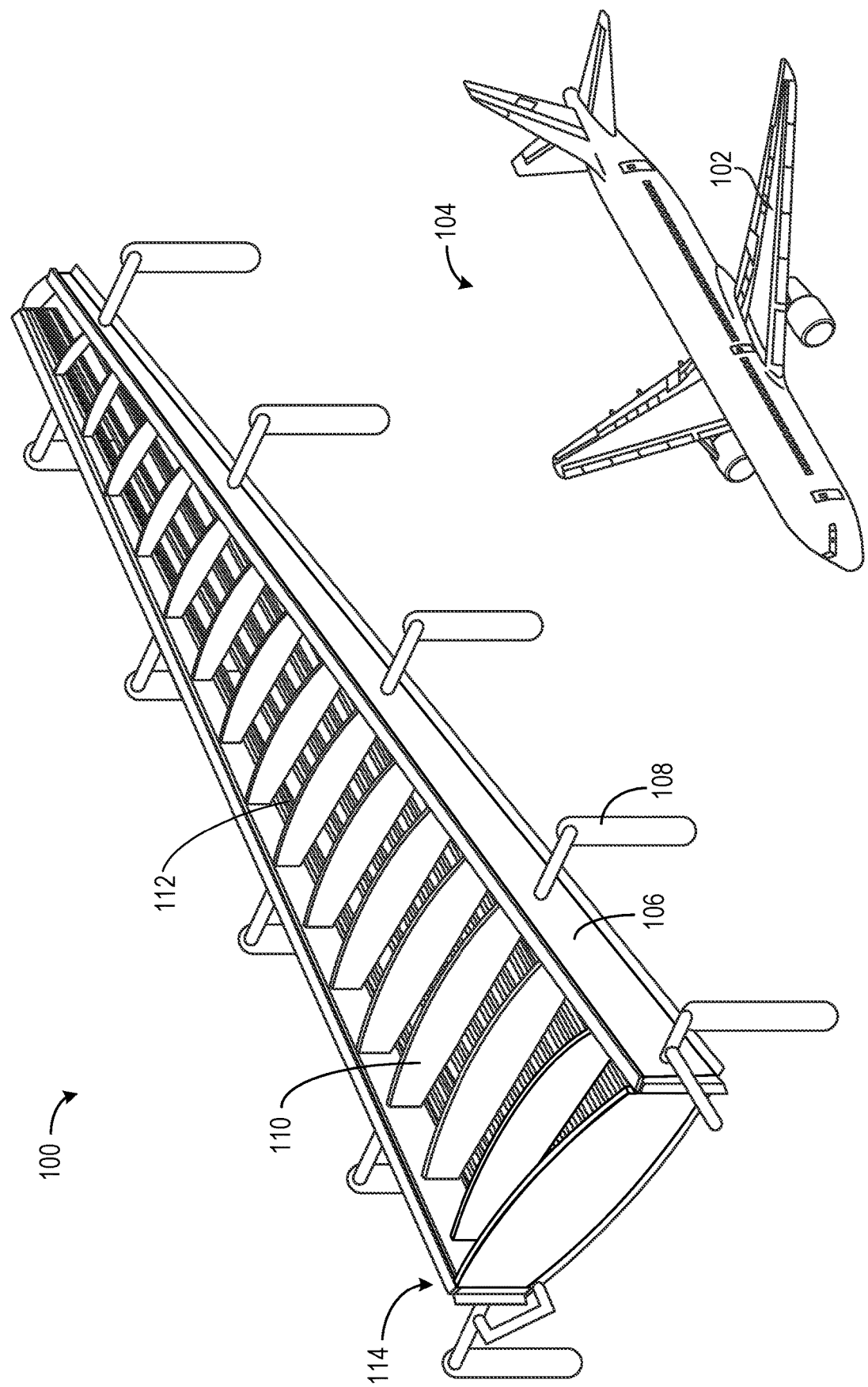
FIG. 1A illustrates a system for forming a bonded wing of an aircraft, according to an example implementation.
FIG. 1B illustrates an example of the aircraft including the bonded wing, according to an example implementation.

FIG. 1A illustrates a system 100 for forming a bonded wing 102 of an aircraft 104, according to an example implementation. FIG. 1B illustrates an example of the aircraft 104 including the bonded wing 102.

The system 100 includes a plurality of spars 106, which are held in place by a plurality of fixture arms 108. The plurality of fixture arms 108 are not included in the assembled wing, but are rather provided for purposes of assembly. Other fixtures or tools can be used for holding aspects of the system 100 in place during assembly. The system 100 further includes a plurality of wing ribs 110, which are attached between the spars 106. The system 100 further includes a plurality of longerons 112, which run parallel to the spars 106, and which provide an interface between the wing ribs 110 and other aspects of the system 100. The longerons 112 may provide a strength to the system 100.

The spars 106 can collectively form a portion of a wing box 114 that provides lateral structure to the system 100, and which provides a general shape and dimension of the system 100. Further, additional components of the system 100 may couple to the wing box 114. Accordingly, the dimensions of the spars 106 may strictly adhere to design plans for the wing 102.

Figure 2:
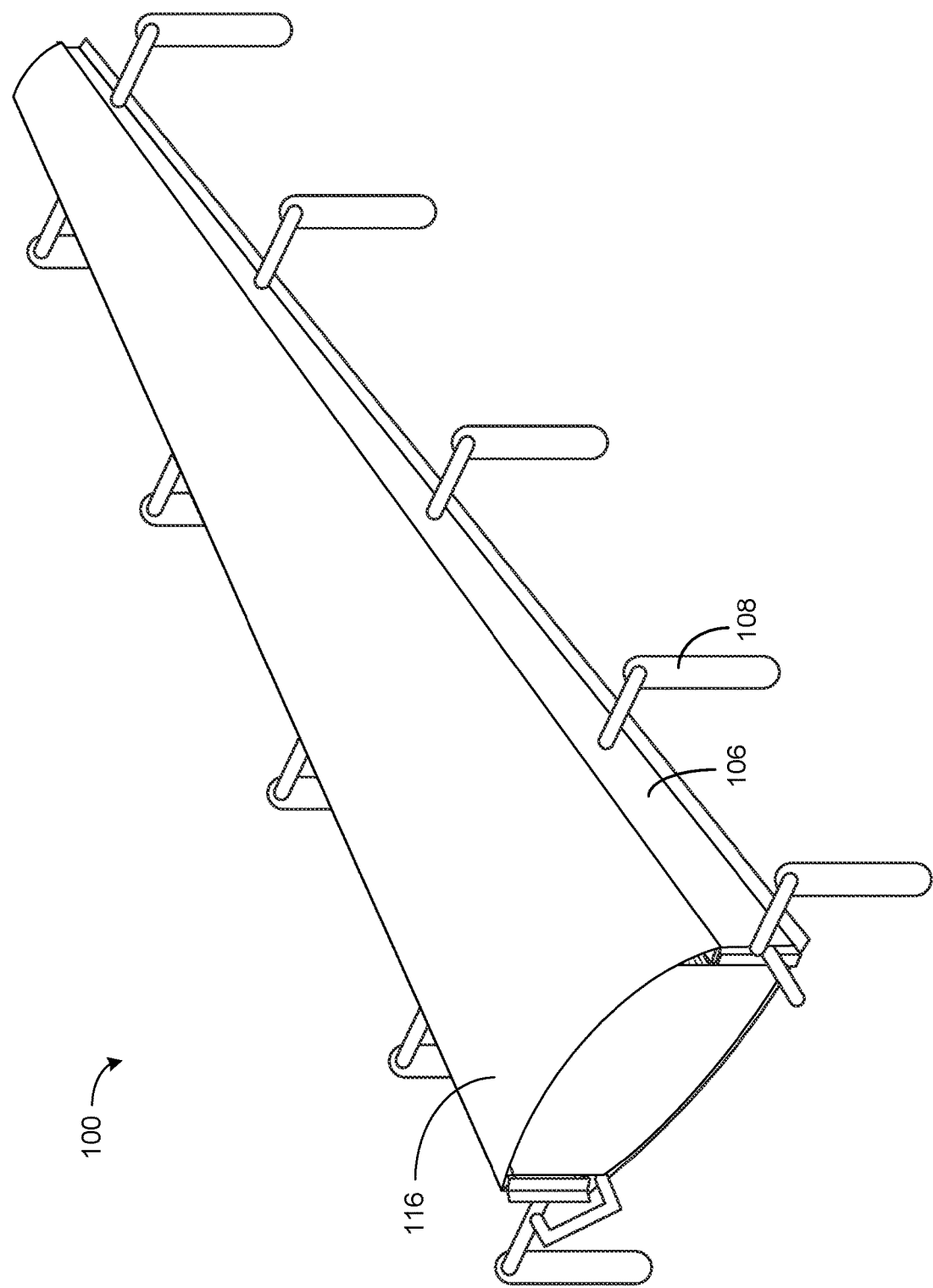
FIG. 2 illustrates the system with a portion of a wing skin coupled or bonded to the spars, the wing ribs, and the longerons, according to an example implementation.

FIG. 2 illustrates the system 100 with a portion of a wing skin 116 coupled or bonded to the spars 106, the wing ribs 110, and the longerons 112, according to an example implementation. By coupling the wing skin 116 to a component of the wing (e.g., the spars 106, the wing ribs 110, and the longerons 112), the bonded wing 102 is formed.

FIGS. 3A-3I and FIGS. 5A-5H illustrate various example phases of joining a first structure to a second structure, according example implementations. An example first structure can include a component of the wing 102 of the aircraft 104, and an example second structure can include the wing skin 116 of the wing 102 of the aircraft 104. By joining the first structure and the second structure, a bondline is created between the first structure and the second structure. The first structure and the second structure can include other components of the wing 102 or other components of the aircraft 104 as well. For instance, in an example, the first structure 120 and the second structure 122 can be a fuselage stringer and fuselage skin. Other examples are possible as well.

Figure 3A:
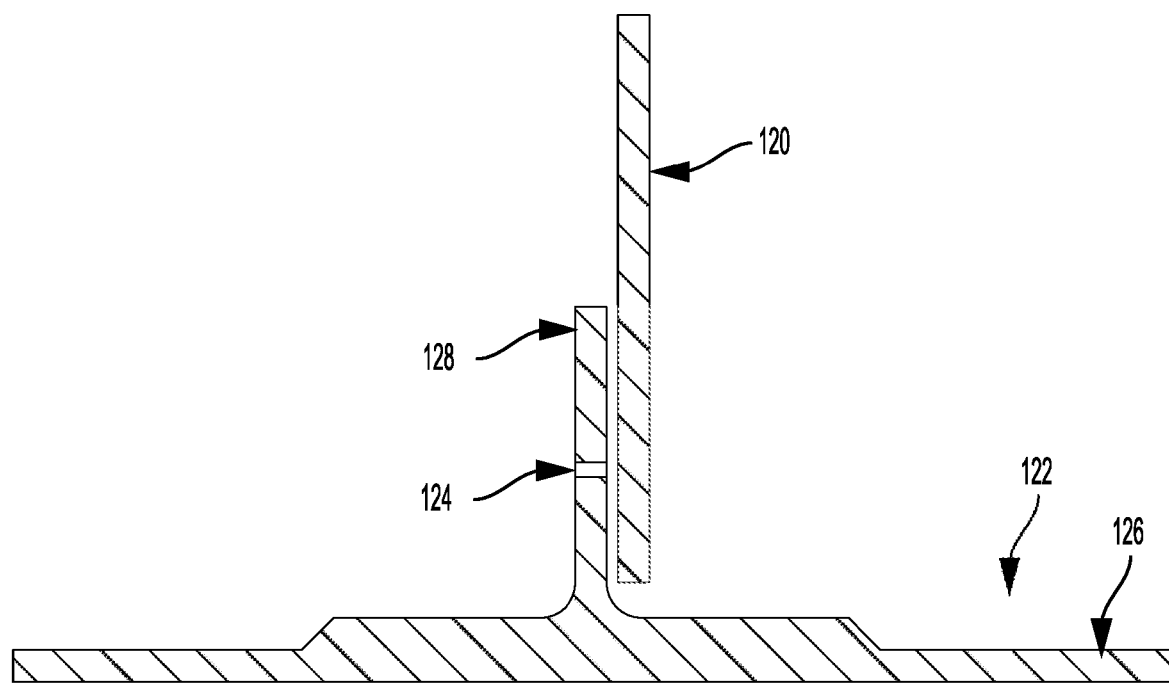
FIGS. 3A-3I illustrate example stages of a process to join a first structure to a second structure in a single-shear configuration, according to an example implementation.

FIGS. 3A-3I illustrate an example process to join a first structure 120 to a second structure 122 in a single-shear configuration, according to an example implementation. In particular, FIG. 3A shows a cross-sectional view of an initial stage of joining the first structure 120 to the second structure 122. The first structure 120, which may be a wing component such as the spars 106, the wing ribs 110, or the longerons 112, is held in placed with one or more fixtures (not shown in FIG. 3A, which can include the fixture arms 108 of FIG. 1A) relative to the second structure 122, which can include or be the wing skin 116. A manifold hole 124 is predrilled through the second structure 122.

As shown in FIG. 3A, the second structure includes a base 126 and a flange 128 extending perpendicular to the base 126. The first structure 120 is held in place by the fixture(s) (e.g., example fixtures shown in FIG. 4) so that the first structure 120 is adjacent to and parallel with the flange 128.

Figure 3B:
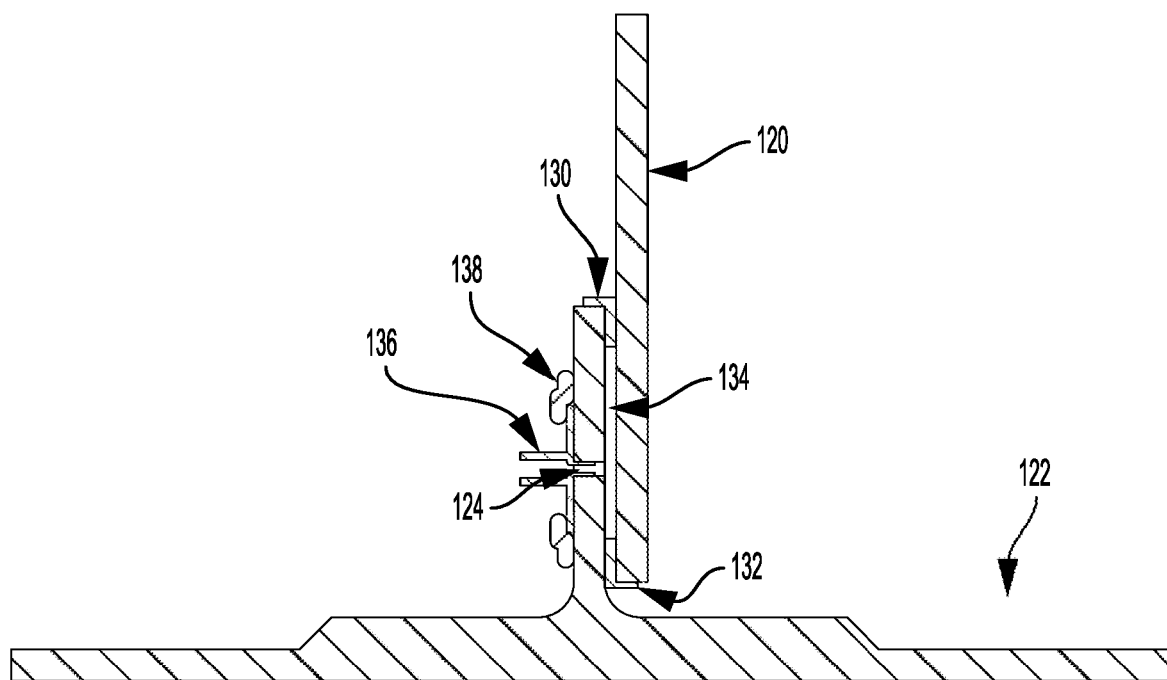

FIG. 3B illustrates a cross-sectional view of a next stage in which spacers 130 and 132 are provided between the first structure 120 and the second structure 122 so that the first structure 120 and the second structure 122 can be moved relatively to form a bond cavity 134 between the first structure 120 and the second structure 122. To do so, the first structure 120 may be moved toward the second structure 122, which can be stationary. Alternatively, the second structure can be moved toward the first structure 120, which can be stationary. Still alternatively, both the first structure 120 and the second structure 122 can be moved in a relative manner toward one another.

The spacers 130 and 132 can be positioned every two inches or so to maintain separation of the first structure 120 and the second structure 122. The spacers 130 and 132 maintain a width of the bond cavity 134, for example, as the first structure 120 and the second structure 122 are move relative to one another. The spacers 130 and 132 also maintain a relative positioning of the first structure 120 to the second structure 122 in x and y orientations. The spacers 130 and 132 can be tacked with adhesive tape to be mounted in place.

In FIG. 3B, an adhesive port 136 is inserted into the manifold hole 124, and vacuum seal tape 138 is used to create a vacuum seal attachment of the adhesive port 136 to the second structure 122. The adhesive port 136 is inserted with pressure to maintain a resin-tight seal, and can include a slight taper to port a needle, or a rubber sleeve to ensure airtightness. The adhesive port 136 can be temporarily bonded to the first structure 120 as well to hold in place.

Figure 3C:
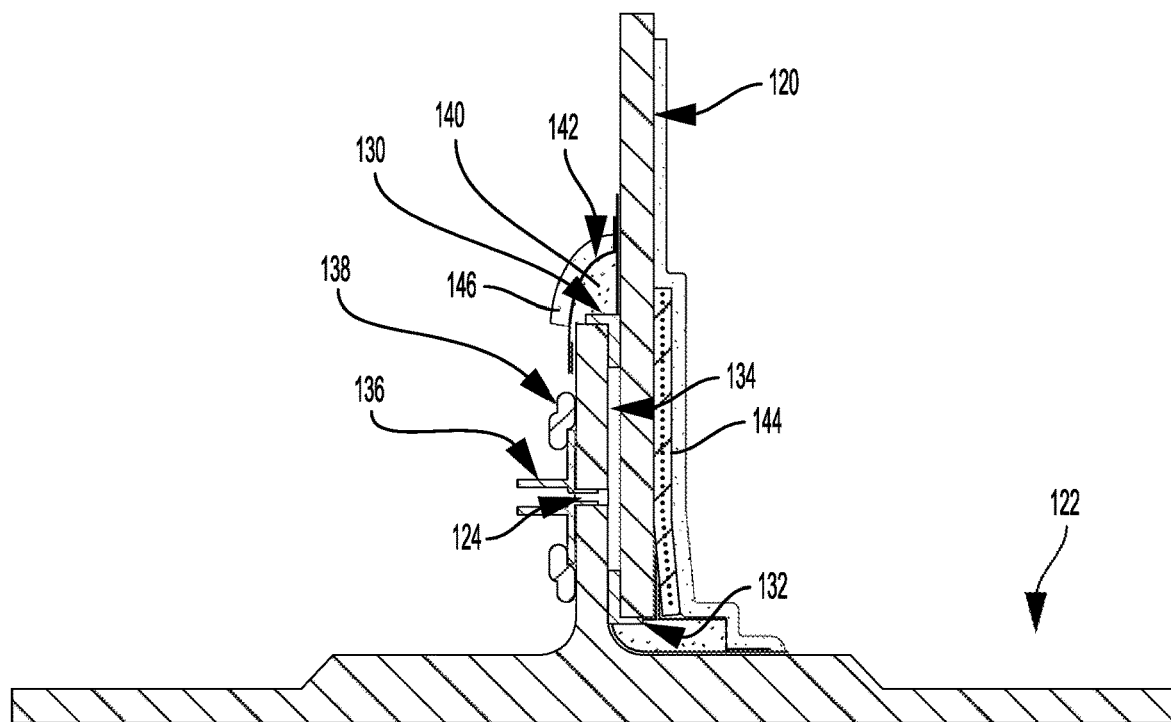

FIG. 3C illustrates a cross-sectional view of a next stage in which a semi-permeable breather material 140 is placed or positioned at one or more exits (e.g., exits 149/151 shown in FIG. 3E) of the bond cavity 134. The semi-permeable breather material 140 can include a material such as foam or rubber, for example. The semi-permeable breather material 140 can also include open cell foam, or semi-porous fiberglass material, for example.

Following, perforated adhesive tape 142 is placed over the semi-permeable breather material 140 to allow vacuum through and to block flow of adhesive, for example. A heater 144, such as a heat blanket, is positioned adjacent to the bond cavity 134, and a highly permeable breather material 146 is positioned over the perforated adhesive tape 142 and the heater 144, such as additional foam or rubber. (The highly permeable breather material 146 enables evacuation of materials (whereas the semi-permeable breather material 140 assists to entrap adhesive, for example)).

Figure 3D:
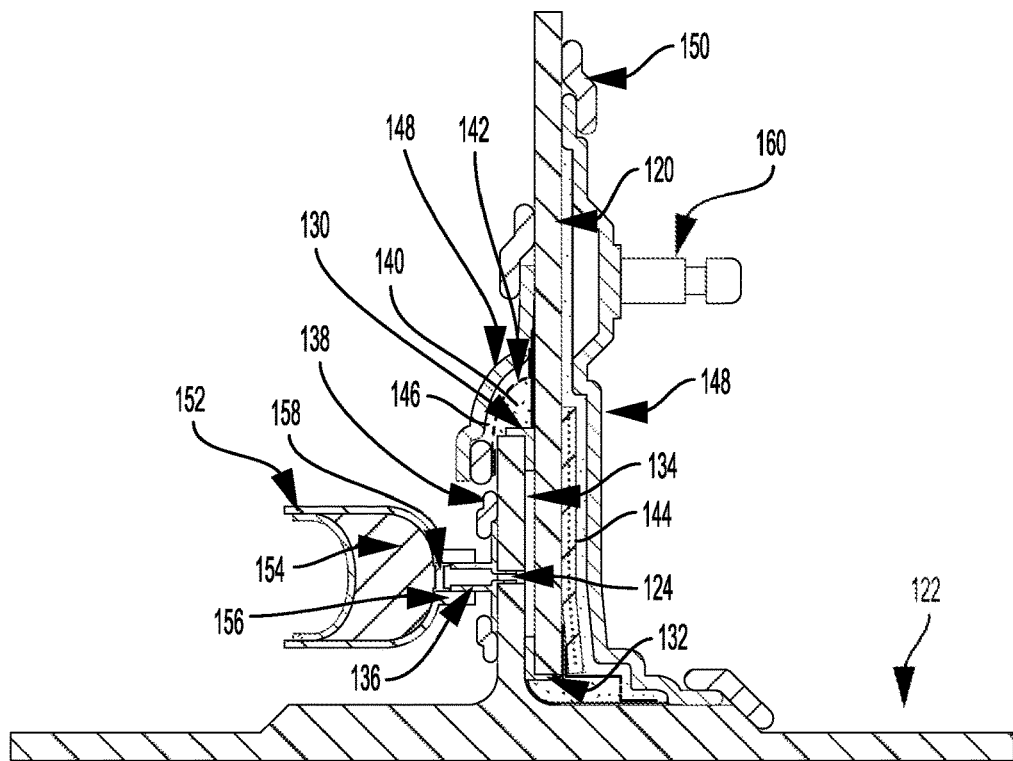

FIG. 3D illustrates a cross-sectional view of a next stage in which a vacuum bag 148 is placed or positioned around the bond cavity 134 and the semi-permeable breather material 140. The vacuum bag 148 is applied to each side to create a sealed enclosure. The vacuum bag 148 is placed around the heater 144 as well. The vacuum bag 148 can include a silicon rubber or nylon rubber bag, for example. Vacuum seal tape 150 is used to seal the vacuum bag 148 to the first structure 120 and the second structure 122.

In some examples, the heater 144 is optional, and a separate heating element is incorporated into the vacuum bag 148. Still other forms of heating can be provided as well, such as forced air that convectively heats the adhesive or induction heating when inductable media is placed at or near the bondline.

In FIG. 3D, an adhesive cartridge 152 containing adhesive 154 is inserted into the adhesive port 136, and the adhesive cartridge 152 includes a dispenser 156 to dispense the adhesive 154 and a frangible seal 158 proximal the dispenser 156. The adhesive cartridge 152 includes de-aerated adhesive (e.g., adhesive paste with bubbles evacuated or air evacuated). The frangible seal 158 prevents air from entering the adhesive cartridge 152.

In some examples, the dispenser 156 slides over the adhesive port 136 and forms a seal on the adhesive port 136 by snapping in place. In other examples, the dispenser 156 is inserted into the adhesive port 136.

In FIG. 3D, a vacuum port 160 is coupled to the vacuum bag 148 for evacuating the bond cavity 134 via a vacuum (not shown).

Figure 3E:
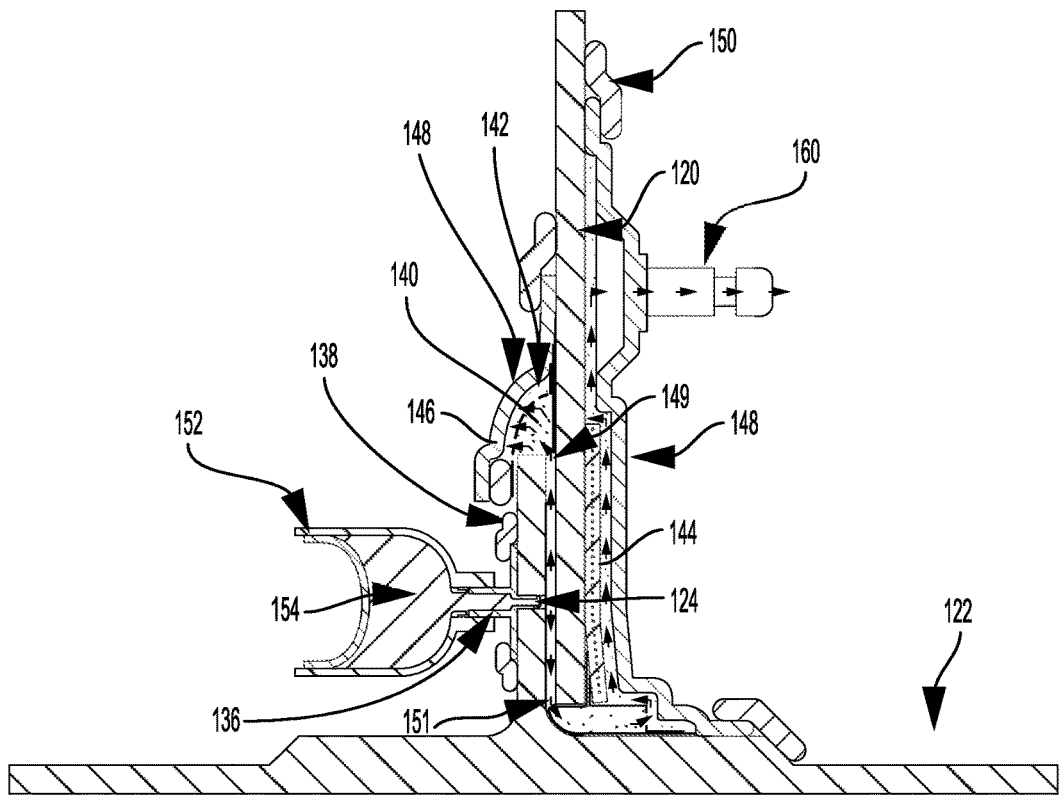

FIG. 3E illustrates a cross-sectional view of a next stage in which the vacuum port 160 is activated to evacuate the bond cavity 134 of air. Arrows are shown to illustrate air drawn out of the bond cavity 134 and through the semi-permeable breather material 140, and then out through the vacuum port 160. The air is evacuated from all areas within the vacuum bag 148, for example, in order to evacuate all air out of areas where the adhesive will be injected in order to enable a voidfree bondline to be created.

Figure 3F:
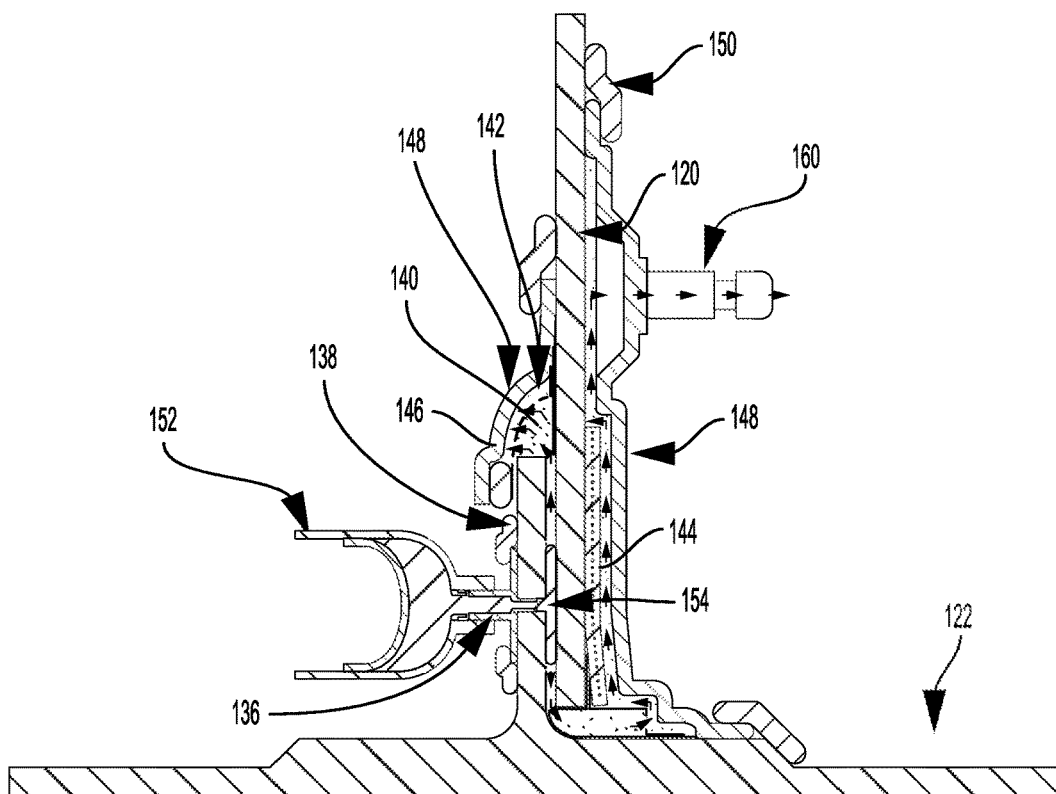

FIG. 3F illustrates a cross-sectional view of a next stage in which the adhesive 154 is inserted into the bond cavity 134. For example, the adhesive 154 is forced into the bond cavity 134 via the adhesive port 136 while the bond cavity 134 is evacuated. By using de-aerated adhesive, and having an evacuated bond cavity, a voidfree bondline can be created.

In one example, the adhesive 154 is forced into the bond cavity 134 while the bond cavity 134 is being evacuated. For example, vacuum pressure will break or rupture the frangible seal 158 and draw the adhesive 154 into the bond cavity 134. Capillarity advances, for example, can cause the adhesive 154 to be drawn through the bond cavity 134.

In another example, the adhesive 154 is forced into the bond cavity 134 by applying pressure to the adhesive cartridge 152 to force the adhesive 154 into the bond cavity 134. In this example, the vacuum can still be turned on so that the bond cavity 134 is still being evacuated or the vacuum can be turned off.

As shown in FIG. 3F, the adhesive 154 will flow into the bond cavity 134 and fill all areas as shown by the arrows. The adhesive 154 has no air and when injected into the evacuated bond cavity, no voids or trapped air bubbles will be present. The semi-permeable breather material 140 allows air to pass, but will prevent the adhesive 154 from flowing out of the bond cavity 134.

Figure 3G:
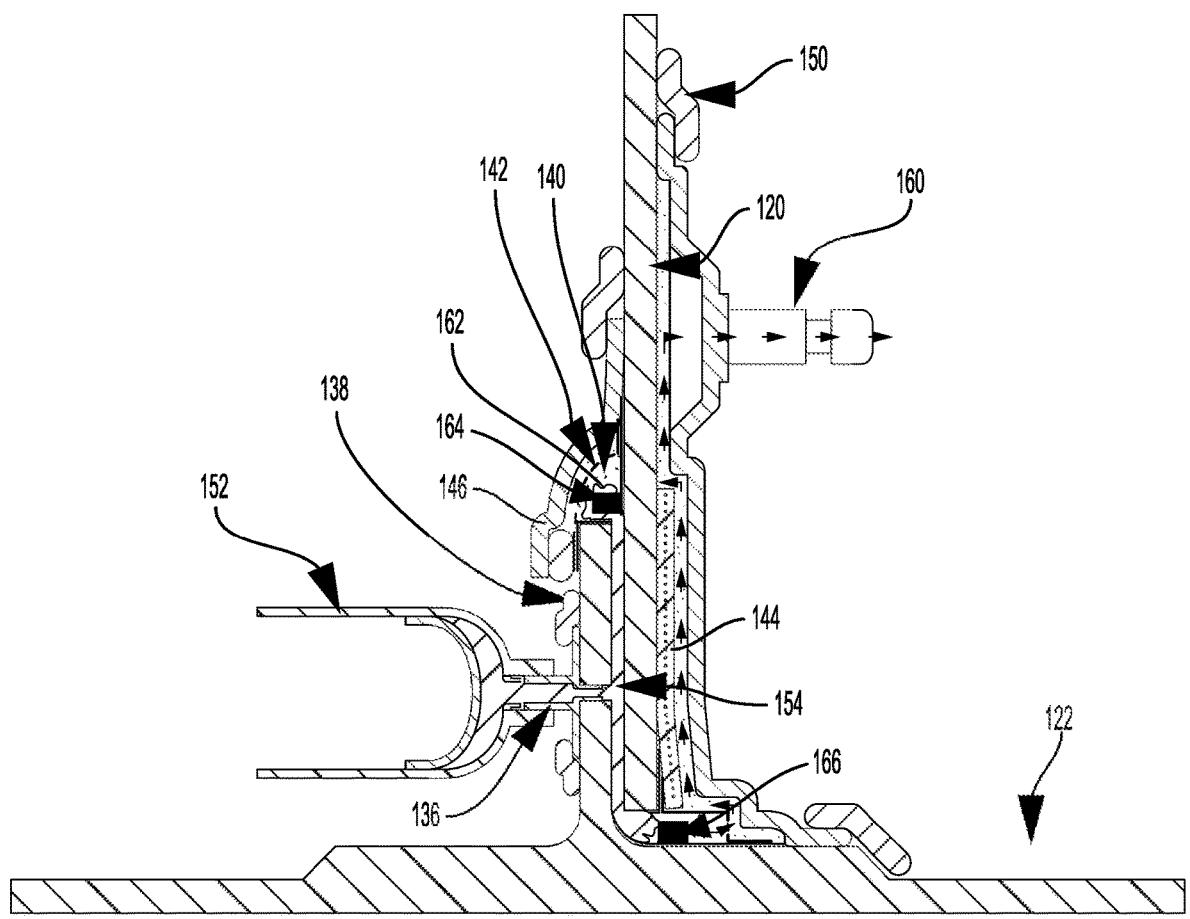

FIG. 3G illustrates a cross-sectional view of a next stage in which the adhesive 154 fills the bond cavity 134. The adhesive 154 will be drawn out of the bond cavity 134 and may extend slightly into or at least contact the semi-permeable breather material 140. For instance, excess adhesive 162 is shown. Also, as shown in this example, the vacuum continues to draw air out through the vacuum port 160 during this process. However, once the bond cavity 134 is filled with the adhesive 154, the vacuum can alternatively discontinue evacuating the bond cavity 134 via the vacuum port 160. It may be beneficial, however, to continue evacuation via the vacuum port 160 to prevent any air from seeping back into the bond cavity 134.

In FIG. 3G, fill sensors 164 and 166 are disposed at least partially in the semi-permeable breather material 140. In one example, the fill sensors 164 and 166 are embedded into the perforated adhesive tape 142. In other examples, the sensors are embedded within the semi-permeable breather material 140. In still other examples, the fill sensors 164 and 166 are tacked into place within the bondline using adhesive applied prior to mating the structures. The fill sensors 164 and 166 detect that the adhesive 154 fills the bond cavity 134, for example, and communicate the information in any number of manners. Communication by the fill sensors 164 and 166 can include, for example, using wireless communications, via an embedded light emitting diode (LED), or via sound. For example, the fill sensors 164 and 166 can include any of a radio frequency identification (RFID) tag configured to modulate frequency response based on the adhesive 154 contacting the RFID tag, a piezo electric sensor configured to change a response as the adhesive 154 moves toward the piezo electric sensor and based on the adhesive 154 contacting the piezo electric sensor, a capacitive sensor configured to respond to adjacent sealant, and a resistive sensor configured to respond to adhesive wetting and resultant resistivity changes by contact. The fill sensors 164 and 166 may also be a conductivity sensor, for example, in scenarios where the adhesive is electrically conductive, so that two leads are extended into the adhesive outflow area and are activated when the adhesive completes a circuit between the two leads. Different combinations of sensors can also be used.

In some examples, the spacers 130 and 132 may be omitted, and the fill sensors 164 and 166 can be used as spacers themselves when inserted or positioned between the first structure 120 and the second structure 122 to maintaining a width of the bond cavity 134.

Figure 3H:
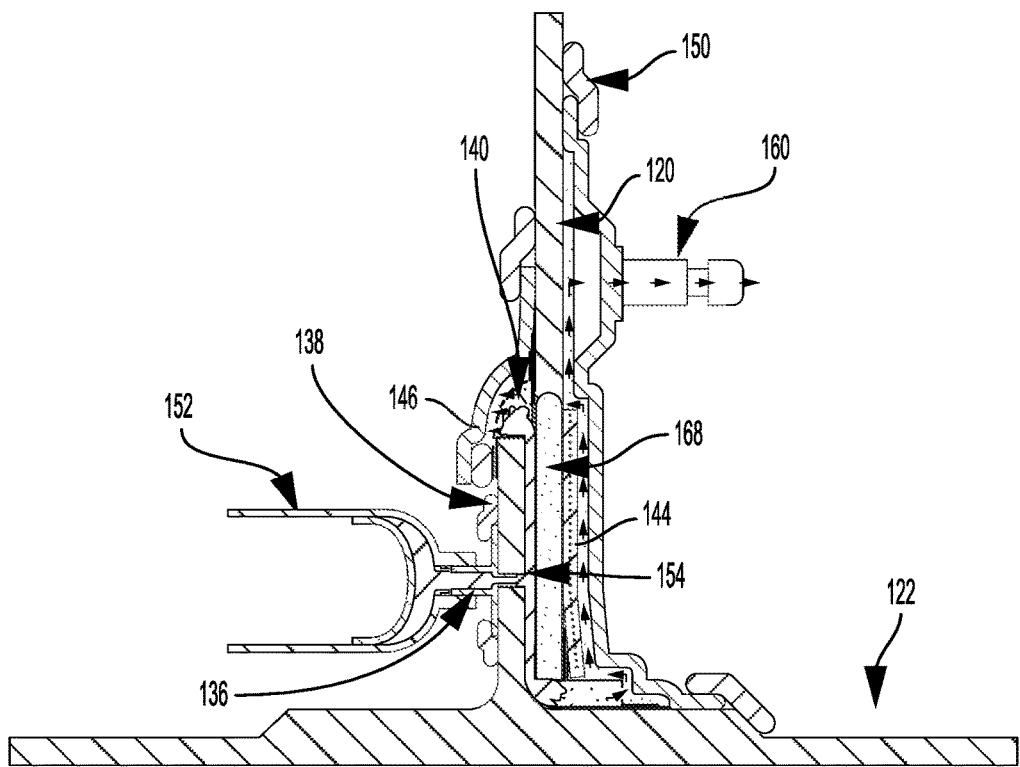

FIG. 3H illustrates a cross-sectional view of a next stage in which the adhesive 154 is cured via the heater 144 to bond the first structure 120 to the second structure 122. Curing the adhesive 154 occurs after filling the bond cavity 134 with the adhesive, for example. In FIG. 3H, the heater 144 is turned on causing heat 168 to flow through the structures and adhesive. The heater 144 can include a silicon rubber pad with resistive elements (e.g., flexible wires running through the pad) to provide resistance heating, for example.

Prior to curing the adhesive 154, for example, the vacuum can be shut off (manually or using an electronic valve).

Figure 3I:
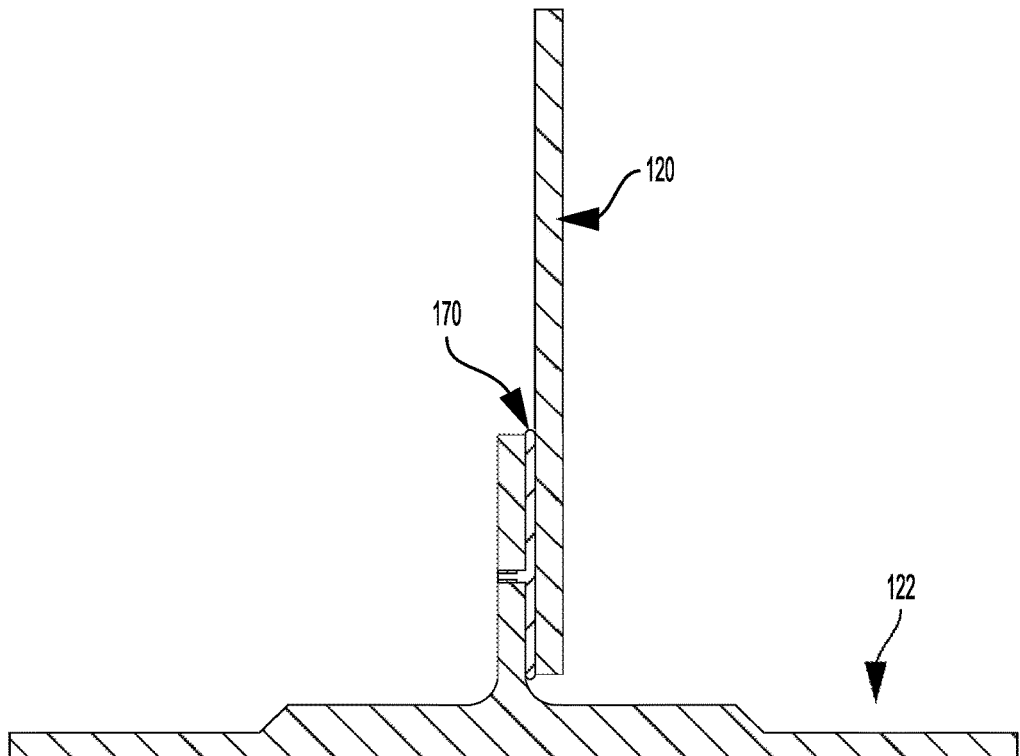

FIG. 3I illustrates a cross-sectional view of a next stage in which components are removed from the first structure 120 and the second structure 122, and any excess adhesive is trimmed at edges resulting in a bondline 170 being formed to join the first structure 120 and the second structure 122. The bondline 170 is a voidfree bondline, for example.

In the example series shown in FIGS. 3A-3I to join the first structure 120 to the second structure 122, the manifold hole 124 is shown in the flange 128 of the second structure 122. In other examples, however, the manifold hole 124 can alternately be included in the first structure 120 and arrangement of components can be aligned or flipped horizontally about the bond cavity 134 that is formed.

Figure 4:
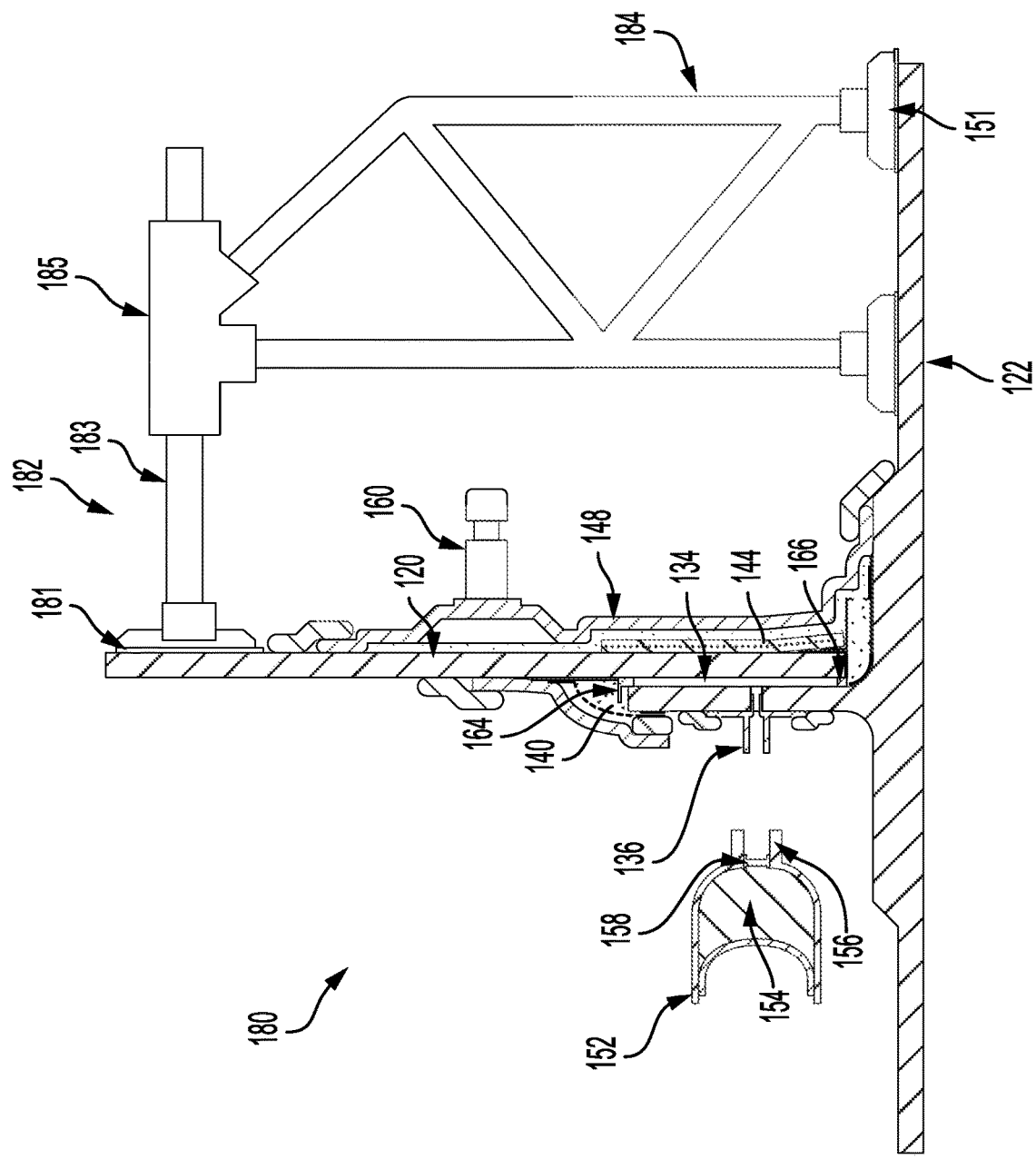
FIG. 4 illustrates an example of a system for joining the first structure and the second structure, according to an example implementation.

FIG. 4 illustrates an example of a system 180 for joining the first structure 120 and the second structure 122, according to an example implementation. The system 180 includes one or more fixtures 182 and 184 forming the bond cavity 134 between the first structure 120 and the second structure 122 via positioning of the first structure 120 relative to the second structure 122. The system 180 also includes the semi-permeable breather material 140 positioned at one or more exits of the bond cavity 134, the vacuum bag 148 positioned around the bond cavity 134 and the semi-permeable breather material 140, the vacuum port 160 coupled to the vacuum bag 148 for evacuating the bond cavity 134 and forcing adhesive 154 into the bond cavity 134 via the adhesive port 136 while the bond cavity 134 is evacuated, and one or more heaters 144 for curing the adhesive 154 to bond the first structure 120 to the second structure 122.

In one example, the system 180 also includes the adhesive cartridge 152 containing the adhesive 154 inserted into the adhesive port 136, and the adhesive cartridge 152 includes the dispenser 156 to dispense the adhesive 154 and the frangible seal 158 proximal the dispenser 156. While the bond cavity 134 is evacuated, the frangible seal 158 is broken due to vacuum pressure and the adhesive 154 is drawn into the bond cavity 134. In another example, pressure can be applied to the adhesive cartridge 152 to rupture the frangible seal 158 and force the adhesive 154 into the bond cavity 134.

The system 180 can also include the fill sensors 164 and/or 166 disposed at least partially in the semi-permeable breather material 140 for detecting that the adhesive 154 fills the bond cavity 134.

In FIG. 4, the fixtures 182 and 184 are shown coupled to the first structure 120 and the second structure 122 using a temporary adhesive 181. The fixture 182 can include a slider rod 183 movable within a translation sleeve 185 to enable movement of the first structure 120 relative to the second structure 122, for example.

The system 180 can include more or fewer components as well, such as any of the additional components described in FIGS. 3A-3I, for example.

FIGS. 5A-5H illustrate an example process to join a first structure 120 to a second structure 122 in a dual-shear configuration, according to an example implementation. The processes illustrated in FIGS. 5A-5H are similar to those illustrated in FIGS. 3A-3I, however, in the examples in FIGS. 5A-5H, the second structure 122 has two flanges rather than one flange and adhesive is inserted in a port configured through the base of the second structure 122.

Figure 5A:
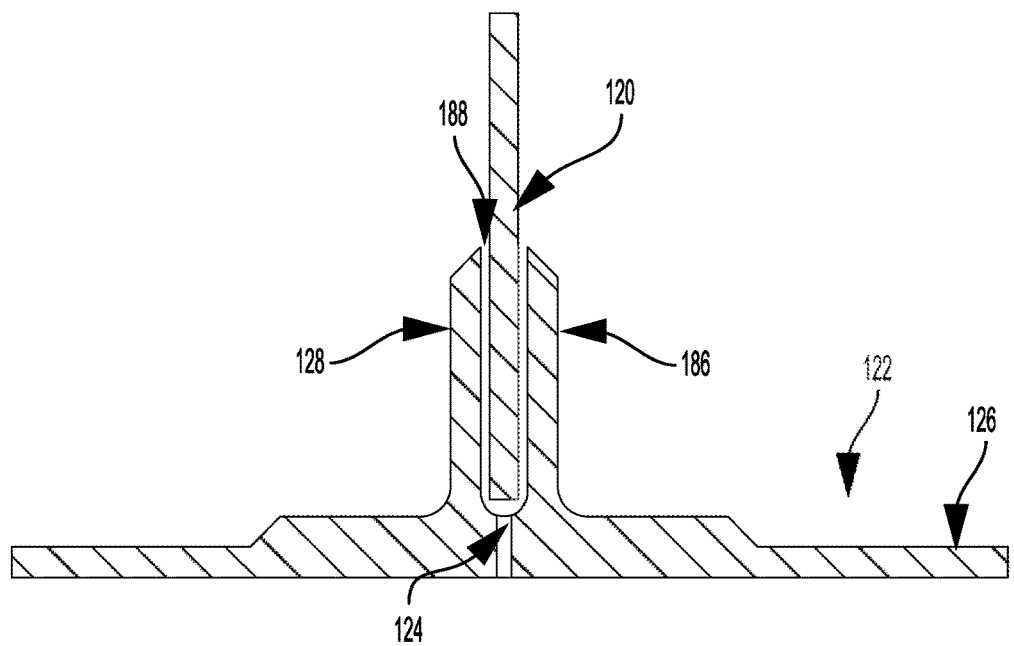
FIGS. 5A-5H illustrate example stages of a process to join a first structure to a second structure in a dual-shear configuration, according to an example implementation.

In particular, FIG. 5A shows a cross-sectional view of an initial stage of joining the first structure 120 to the second structure 122, in which the second structure includes the base 126, the flange 128 extending perpendicular to the base 126, and another flange 186 also extending perpendicular to the base 126. The first structure 120 is held in place by the fixture(s) so that the first structure 120 is adjacent to and parallel with the flange 128, and can be inserted into an opening 188 formed by the flanges 128 and 186.

The manifold hole 124 is predrilled in the base 126 at a location that matches or lines up with the opening 188.

Figure 5B:
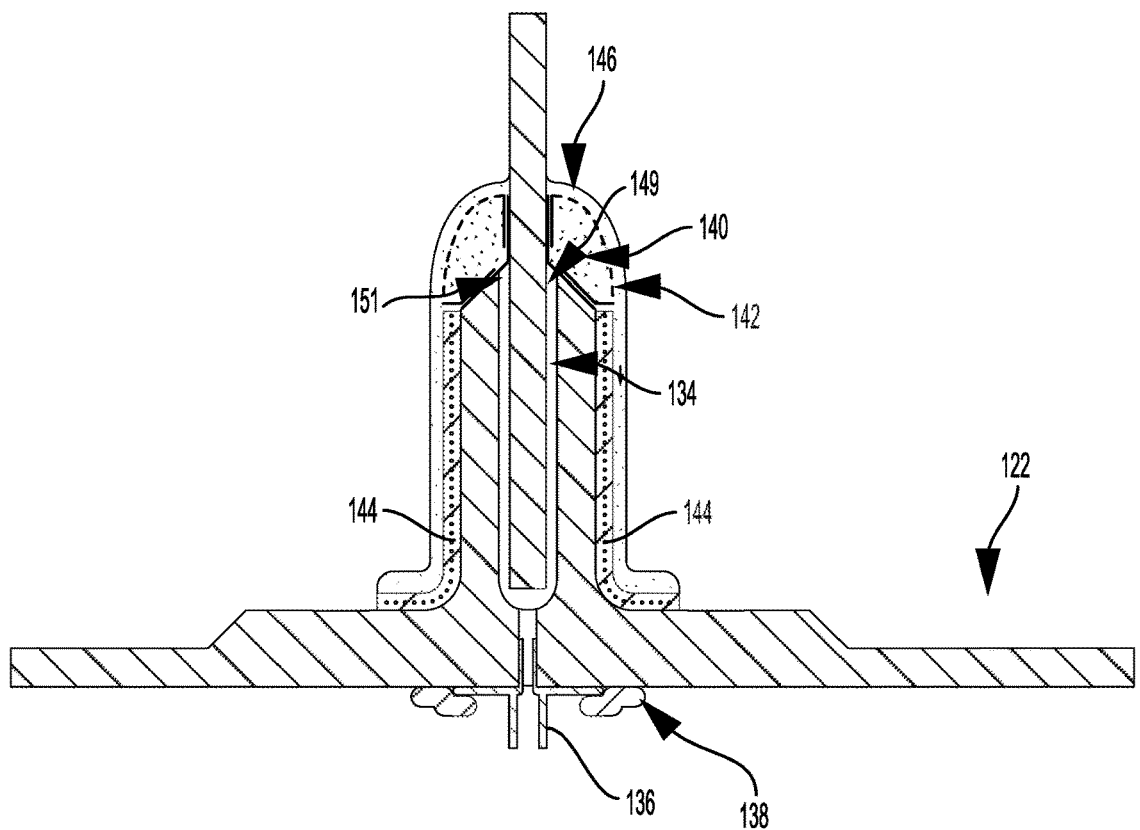

FIG. 5B illustrates a cross-sectional view of a next stage in which the adhesive port 136 is inserted into the manifold hole 124, and vacuum seal tape 138 is used to create a vacuum seal attachment of the adhesive port 136 to the second structure 122. The semi-permeable breather material 140 is placed or positioned at one or more exits 149/151 of the bond cavity 134. Following that, the perforated adhesive tape 142 is placed over the semi-permeable breather material 140 to allow air to be drawn through the semi-permeable breather material 140 and to block flow of adhesive, for example. A heater 144, such as a heat blanket, is positioned adjacent to the bond cavity 134, and a highly permeable breather material 146 is positioned over the perforated adhesive tape 142 and the heater 144. In FIG. 5B, two heaters are shown, with one heater 144 on each side of the first structure 120, for example.

Figure 5C:
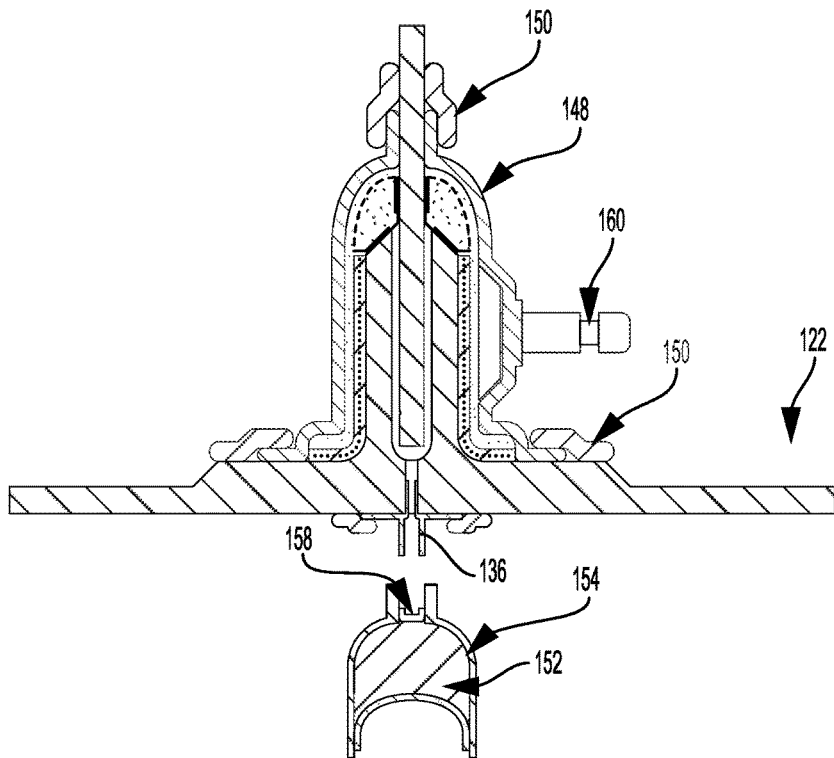

FIG. 5C illustrates a cross-sectional view of a next stage in which a vacuum bag 148 is placed or positioned around the bond cavity 134 and the semi-permeable breather material 140. The vacuum bag 148 is applied to each side to create a sealed enclosure around the bond cavity 134. The vacuum bag 148 is placed around the heater 144 as well. The vacuum bag 148 can include a silicon rubber bag (e.g., reusable) or nylon rubber bag (e.g., disposable), for example. Vacuum seal tape 150 is used to seal the vacuum bag 148 to the first structure 120.

In FIG. 5C, the adhesive cartridge 152 containing the adhesive 154 is then prepared for insertion into the adhesive port 136, and the adhesive cartridge 152 includes the frangible seal 158 and de-aerated adhesive (e.g., adhesive paste with bubbles evacuated or air evacuated). The frangible seal 158 prevents air from entering the adhesive cartridge 152.

Figure 5D:
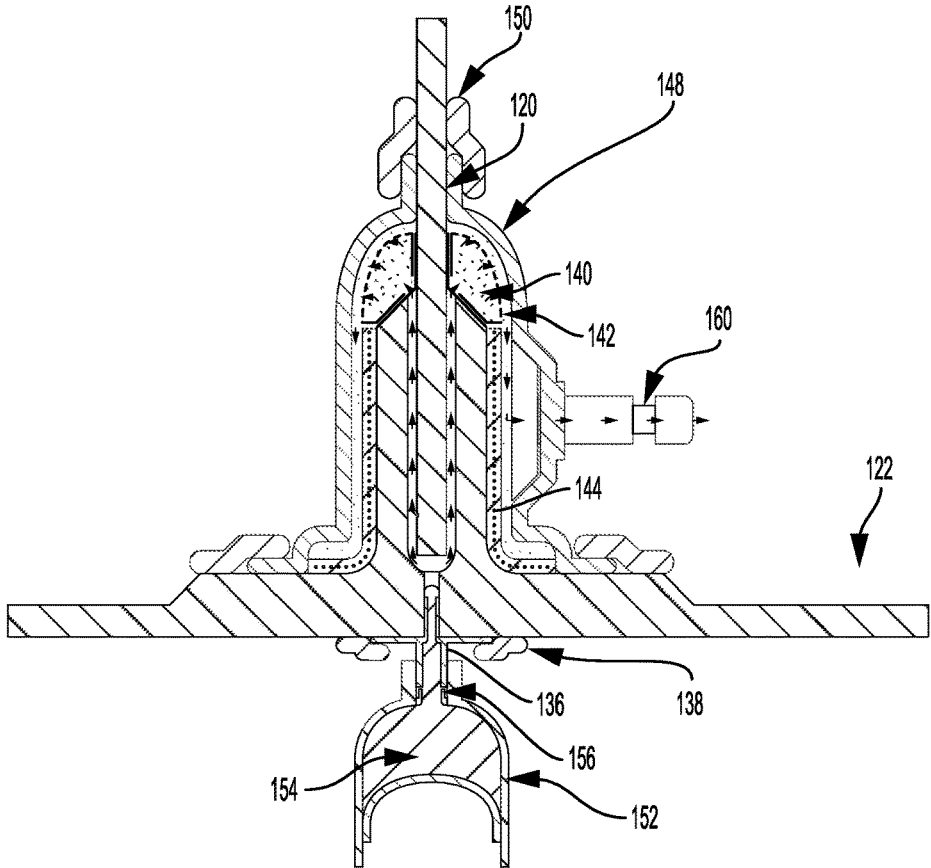

FIG. 5D illustrates a cross-sectional view of a next stage in which the vacuum port 160 is coupled to the vacuum bag 148 for evacuating the bond cavity 134 via a vacuum (not shown), and the vacuum port 160 is activated to evacuate the bond cavity 134 of air. Arrows are shown to illustrate air drawn out of the bond cavity 134 and through the semi-permeable breather material 140, and then out through the vacuum port 160. The air is evacuated from all areas within the vacuum bag 148, for example, in order to evacuate all air out of areas where the adhesive will be injected in order to enable a voidfree bondline to be created. Then, the adhesive 154 is forced into the bond cavity 134 via the adhesive port 136 while the bond cavity 134 is evacuated. By using de-aerated adhesive, and having an evacuated bond cavity, a voidfree bondline can be created. In one example, the adhesive 154 is forced into the bond cavity 134 while the bond cavity 134 is being evacuated due to vacuum pressure breaking the frangible seal 158 and drawing the adhesive 154 into the bond cavity 134.

Figure 5E:
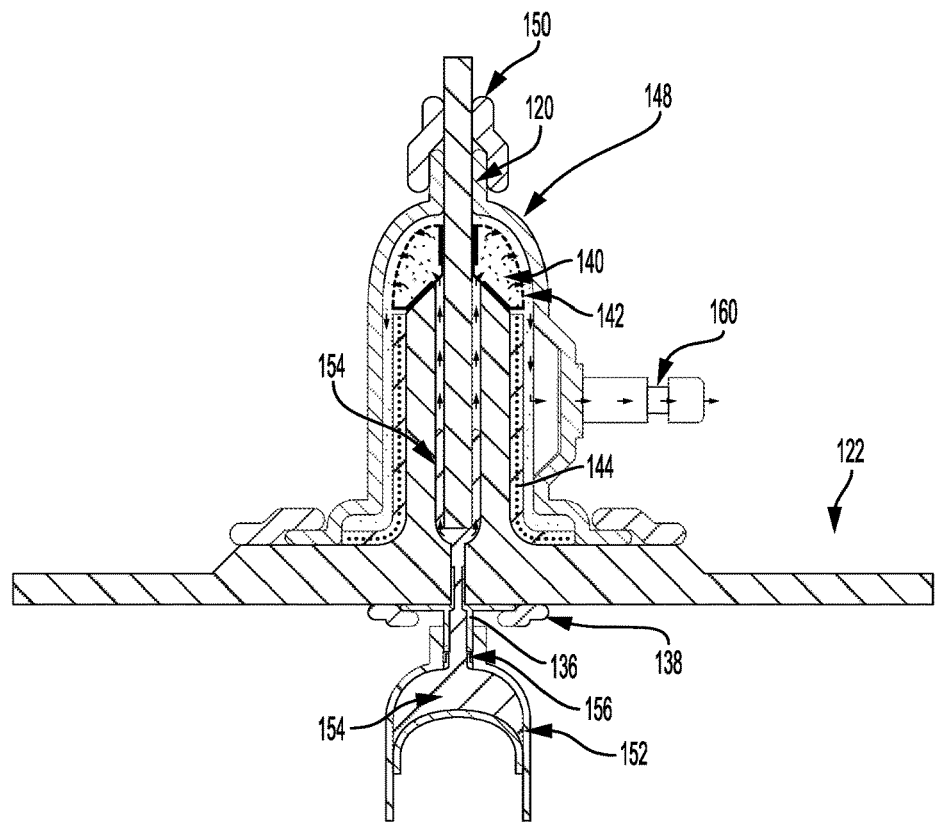

FIG. 5E illustrates a cross-sectional view of a next stage in which the evacuated adhesive 154 will flow into the bond cavity 134 and fill all areas as shown by the arrows. Within examples, the adhesive 154 contains no air and when injected into the evacuated bond cavity, no voids or trapped air bubbles can form. The semi-permeable breather material 140 allows air to pass, but will prevent the adhesive 154 from flowing out of the bond cavity 134.

Figure 5F:
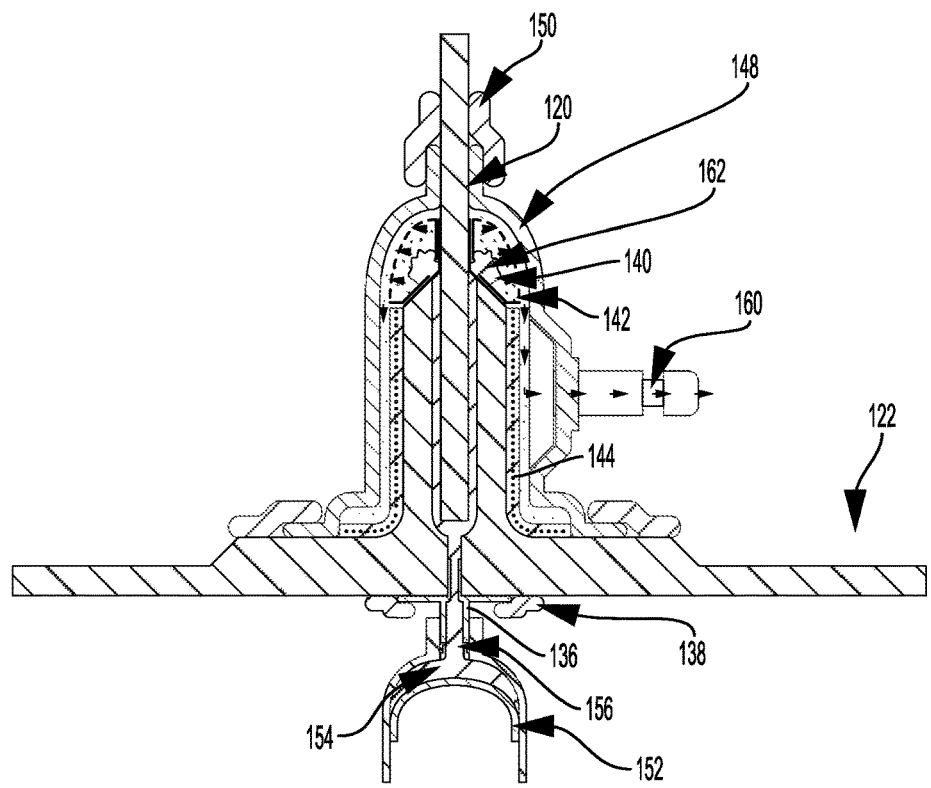

FIG. 5F illustrates a cross-sectional view of a next stage in which the adhesive 154 fills the bond cavity 134. The adhesive 154 will be drawn out of the bond cavity 134 and may extend slightly into or at least contact the semi-permeable breather material 140. For instance, excess adhesive 162 is shown. Also, as shown in this example, the vacuum continues to draw air out through the vacuum port 160 during this process. However, once the bond cavity 134 is filled with the adhesive 154, the vacuum discontinues evacuating the bond cavity 134 via the vacuum port 160. For example, the semi-permeable breather material 140 will be clogged with the excess adhesive 162 at this time, and so the vacuum no longer draws additional adhesive out of the bond cavity 134.

Figure 5G:
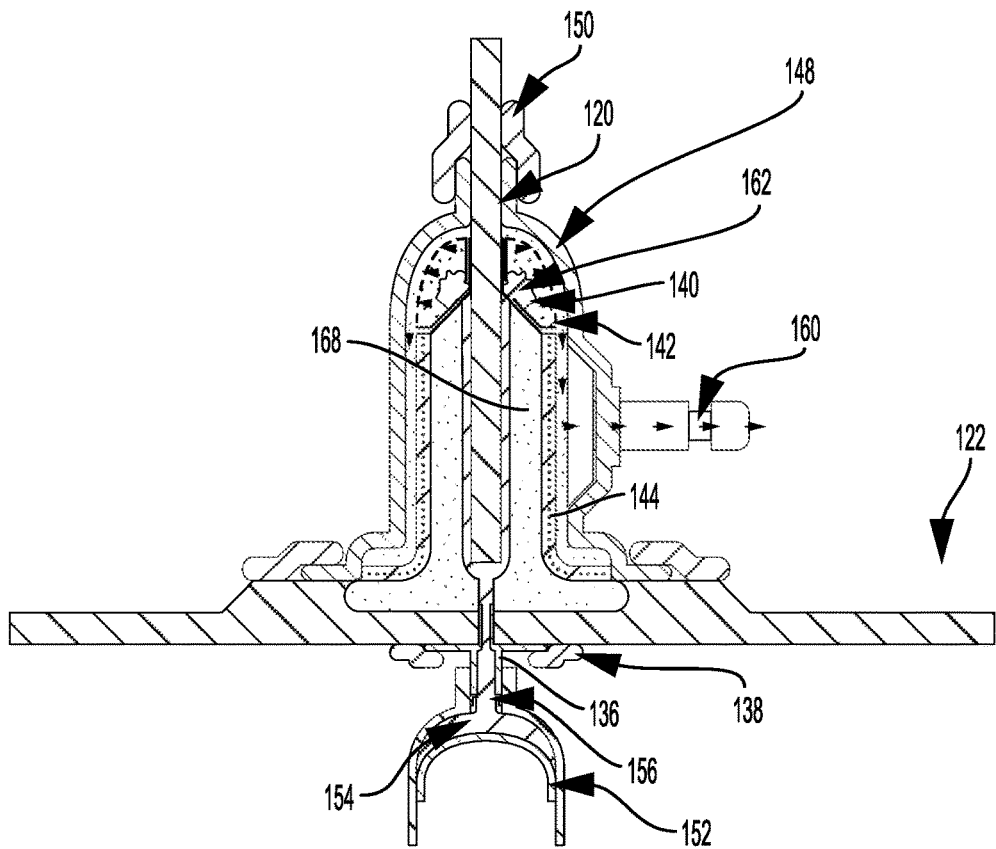

FIG. 5G illustrates a cross-sectional view of a next stage in which the adhesive 154 is cured via the heater 144 to bond the first structure 120 to the second structure 122. Curing the adhesive 154 occurs after filling the bond cavity 134 with the adhesive, for example. In FIG. 5G, the heater 144 is turned on causing heat 168 to flow through the structures and adhesive.

Figure 5H:
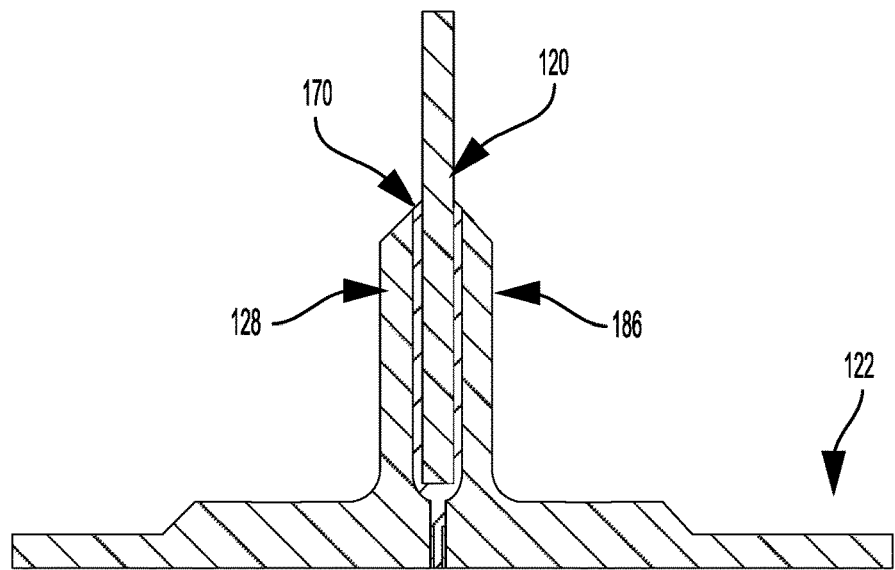

FIG. 5H illustrates a cross-sectional view of a next stage in which components are removed from the first structure 120 and the second structure 122, and any excess adhesive is trimmed at edges resulting in the bondline 170 being formed to join the first structure 120 and the second structure 122. The bondline 170 is a voidfree bondline, for example.

Figure 6:
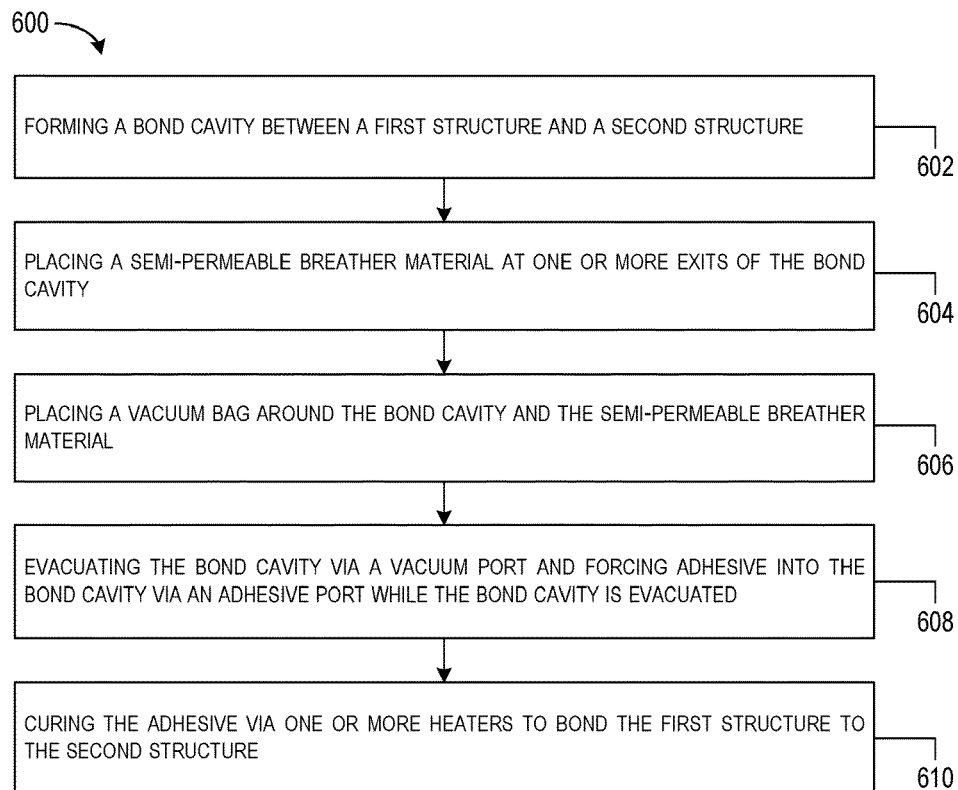
FIG. 6 illustrates a flowchart of a method of joining a first structure and a second structure, according to an example implementation.

FIG. 6 illustrates a flowchart of a method of joining a first structure and a second structure, according to an example implementation. Method 600 shown in FIG. 6 presents an example of a method that could be used with the system 100 and the system 180 shown in FIGS. 1-2 and 4, a combination thereof, or with components of thereof. Further, the functions described with respect to FIG. 6 may be supplemented by, replaced by, or combined with functions and phases described above with respect to FIGS. 3A-3I, FIG. 4, and FIGS. 5A-5H, for example. Further, devices or systems may be used or configured to perform logical functions presented in FIG. 6.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 includes one or more operations, functions, or actions as illustrated by one or more of blocks 602-610. Further, blocks of FIGS. 7-20 may be performed in accordance with one or more of block 602-610. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 600 may be represented in program code or circuitry used for controlling robotic mechanisms for joining the first structure and the second structure (e.g., as for assembling a bonded structure and/or a wing including a plurality of bonded structures). While method 600 and variations thereof may be executed automatically using, for example, one or more robotic armatures controlled by program code operating in accordance with the method 600, some tasks may be performed manually. Thus, within examples, certain functionality described with respect to the method 600 may be performed automatically while other portions can be performed manually. Alternatively, all blocks of the method 600 may be performed automatically or all blocks of the method 600 may be performed manually.

At block 602, the method 600 includes forming the bond cavity 134 between the first structure 120 and the second structure 122.

Figure 7:
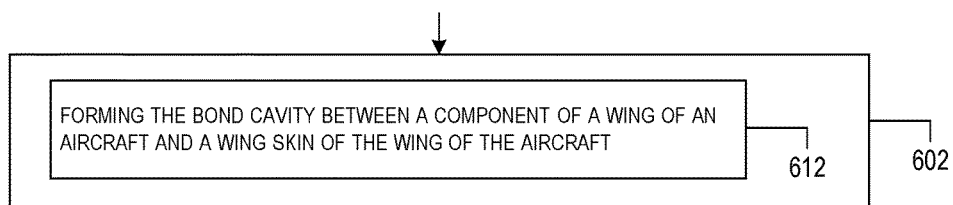
FIG. 7 illustrates a flowchart of functions for use with the method shown in FIG. 6, according to an example implementation.

FIG. 7 illustrates a flowchart of functions for use with the method 600 shown in FIG. 6, according to an example implementation. In particular, FIG. 7 illustrates block 612, which includes an example function for forming the bond cavity 134 between the first structure 120 and the second structure 122 including forming the bond cavity 134 between a component of a wing 102 of an aircraft 104 and a wing skin 116 of the wing 102 of the aircraft 104.

Referring back to FIG. 6, at block 604, the method 600 includes placing the semi-permeable breather material 140 at one or more exits of the bond cavity 134.

Figure 8:
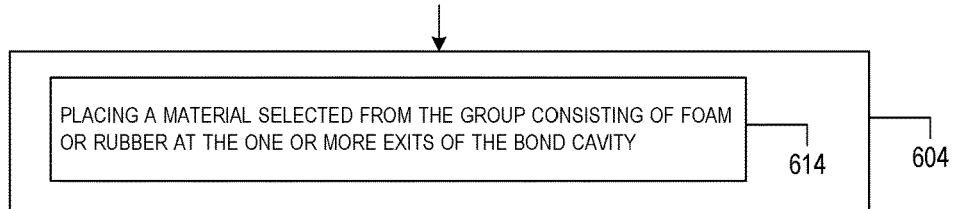
FIG. 8 illustrates a flowchart of functions for use with the method shown in FIG. 6, according to an example implementation.

FIG. 8 illustrates a flowchart of functions for use with the method 600 shown in FIG. 6, according to an example implementation. In particular, FIG. 8 illustrates block 614, which includes an example function for placing the semi-permeable breather material 140 at the one or more exits of the bond cavity 134 including placing a material selected from the group consisting of foam or rubber at the one or more exits of the bond cavity 134.

Figure 9:
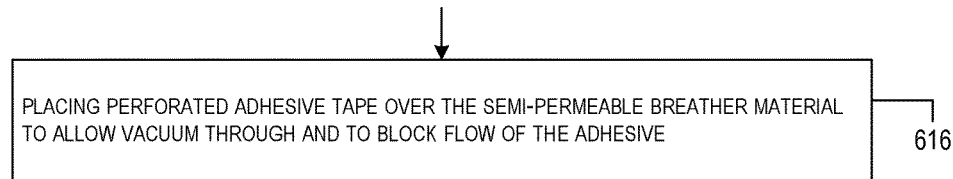
FIG. 9 illustrates a flowchart of functions for use with the method shown in FIG. 6, according to an example implementation.

FIG. 9 illustrates a flowchart of functions for use with the method 600 shown in FIG. 6, according to an example implementation. In particular, FIG. 9 illustrates block 616, which includes a further function of placing the perforated adhesive tape 142 over the semi-permeable breather material 140 to allow vacuum through and to block flow of the adhesive 154.

Referring back to FIG. 6, at block 606, the method 600 includes placing the vacuum bag 148 around the bond cavity 134 and the semi-permeable breather material 140.

At block 608, the method 600 includes evacuating the bond cavity 134 via the vacuum port 160 and forcing adhesive 154 into the bond cavity 134 via the adhesive port 136 while the bond cavity 134 is evacuated.

Figure 10:
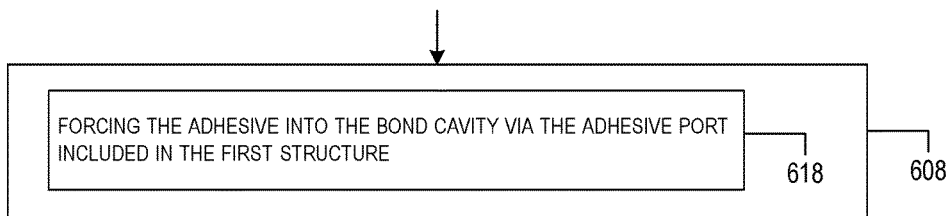
FIG. 10 illustrates a flowchart of functions for use with the method shown in FIG. 6, according to an example implementation.

FIG. 10 illustrates a flowchart of functions for use with the method 600 shown in FIG. 6, according to an example implementation. In particular, FIG. 10 illustrates block 618, which includes an example function for forcing adhesive 154 into the bond cavity 134 via the adhesive port 136 including forcing the adhesive 154 into the bond cavity 134 via the adhesive port 136 included in the first structure 120.

Figure 11:
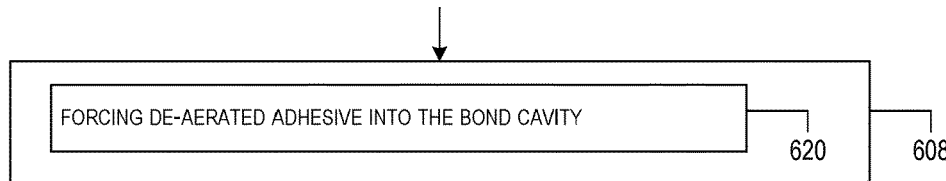
FIG. 11 illustrates another flowchart of functions for use with the method shown in FIG. 6, according to an example implementation.

FIG. 11 illustrates another flowchart of functions for use with the method 600 shown in FIG. 6, according to an example implementation. In particular, FIG. 11 illustrates block 620, which includes an example function for forcing adhesive 154 into the bond cavity 134 via the adhesive port 136 including forcing de-aerated adhesive into the bond cavity 134.

Figure 12:
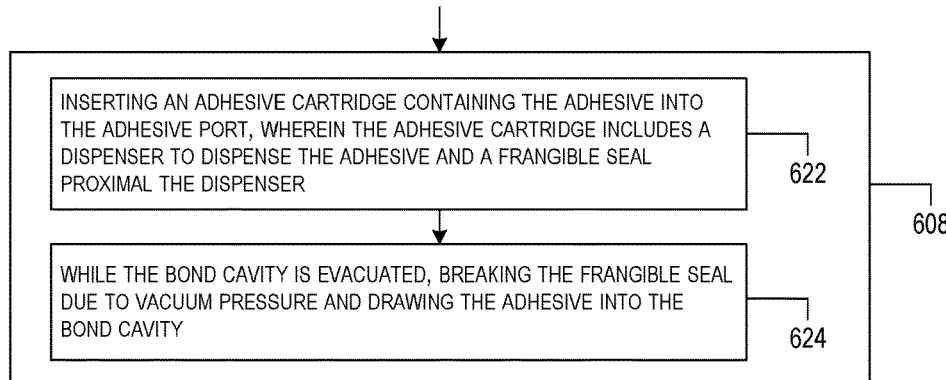
FIG. 12 illustrates a flowchart of functions for use with the method shown in FIG. 6, according to an example implementation.

FIG. 12 illustrates a flowchart of functions for use with the method 600 shown in FIG. 6, according to an example implementation. In particular, FIG. 12 illustrates blocks 622 and 624, which include an example function for forcing adhesive 154 into the bond cavity 134 including inserting an adhesive cartridge 152 containing the adhesive 154 into the adhesive port 136 and the adhesive cartridge 152 includes a dispenser 156 to dispense the adhesive 154 and a frangible seal 158 proximal the dispenser 156, and while the bond cavity 134 is evacuated, breaking the frangible seal 158 due to vacuum pressure and drawing the adhesive 154 into the bond cavity 134.

Figure 13:
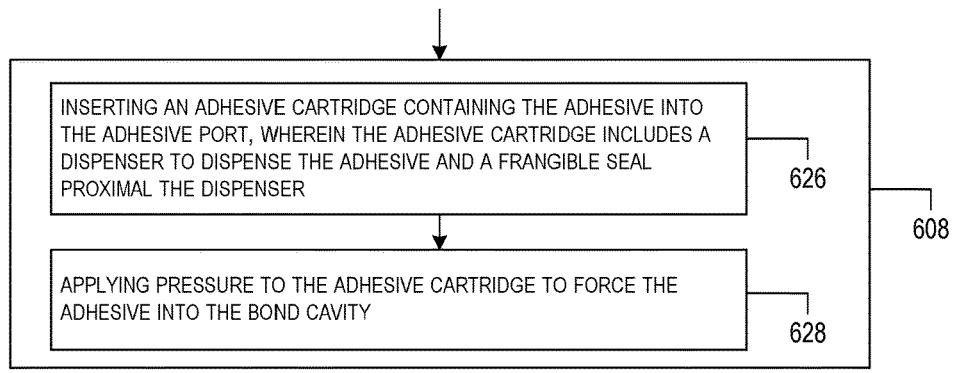
FIG. 13 illustrates a flowchart of functions for use with the method shown in FIG. 6, according to an example implementation.

FIG. 13 illustrates a flowchart of functions for use with the method 600 shown in FIG. 6, according to an example implementation. In particular, FIG. 13 illustrates blocks 626 and 628, which include an example function for forcing adhesive 154 into the bond cavity 134 including inserting an adhesive cartridge 152 containing the adhesive 154 into the adhesive port 136 and the adhesive cartridge 152 includes a dispenser 156 to dispense the adhesive 154 and a frangible seal 158 proximal the dispenser 156, and applying pressure to the adhesive cartridge 152 to rupture the frangible seal 158 and force the adhesive 154 into the bond cavity 134.

Referring back to FIG. 6, at block 610, the method 600 includes curing the adhesive 154 via one or more heaters 144 to bond the first structure 120 to the second structure 122.

Figure 14:
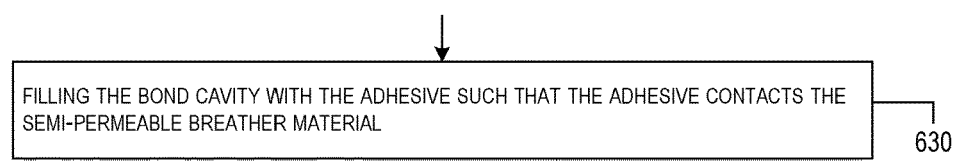
FIG. 14 illustrates a flowchart of functions for use with the method shown in FIG. 6, according to an example implementation.

FIG. 14 illustrates a flowchart of functions for use with the method 600 shown in FIG. 6, according to an example implementation. In particular, FIG. 14 illustrates block 630, which includes a further function of filling the bond cavity 134 with the adhesive 154 such that the adhesive 154 contacts the semi-permeable breather material 140.

Figure 15:
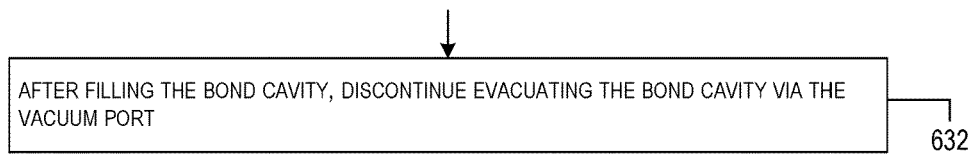
FIG. 15 illustrates a flowchart of functions for use with the method shown in FIG. 6, according to an example implementation.

FIG. 15 illustrates a flowchart of functions for use with the method 600 shown in FIG. 6, according to an example implementation. In particular, FIG. 15 illustrates block 632, which includes a further function of after filling the bond cavity 134, discontinue evacuating the bond cavity 134 via the vacuum port 160.

Figure 16:
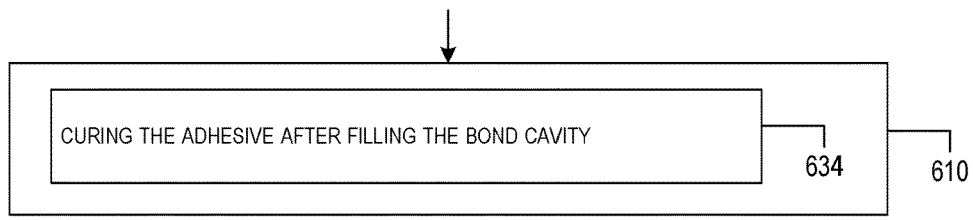
FIG. 16 illustrates a flowchart of functions for use with the method shown in FIG. 6, according to an example implementation.

FIG. 16 illustrates a flowchart of functions for use with the method 600 shown in FIG. 6, according to an example implementation. In particular, FIG. 16 illustrates block 634, which include an example function for curing the adhesive 154 including curing the adhesive 154 after filling the bond cavity 134.

Figure 17:
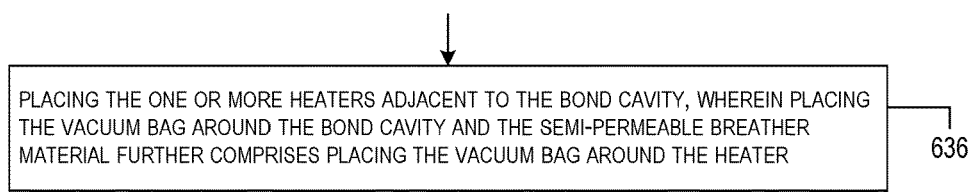
FIG. 17 illustrates a flowchart of functions for use with the method shown in FIG. 6, according to an example implementation.

FIG. 17 illustrates a flowchart of functions for use with the method 600 shown in FIG. 6, according to an example implementation. In particular, FIG. 17 illustrates block 636, which includes a further function of placing the one or more heaters 144 adjacent to the bond cavity 134 and placing the vacuum bag 148 around the bond cavity 134 and the semi-permeable breather material 140 and around the one or more heaters 144.

Figure 18:
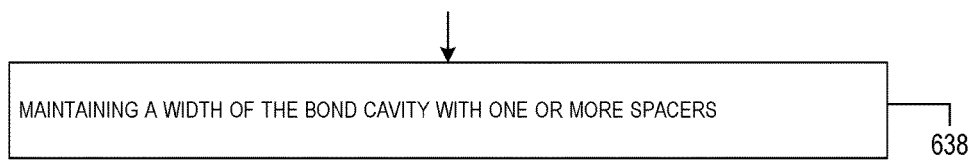
FIG. 18 illustrates a flowchart of functions for use with the method shown in FIG. 6, according to an example implementation.

FIG. 18 illustrates a flowchart of functions for use with the method 600 shown in FIG. 6, according to an example implementation. In particular, FIG. 18 illustrates block 638, which includes a further function of maintaining a width of the bond cavity 134 with one or more spacers 130 and 132.

Figure 19:
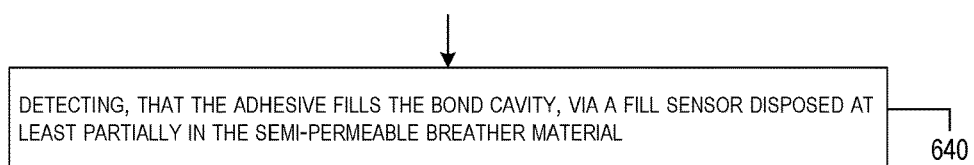
FIG. 19 illustrates a flowchart of functions for use with the method shown in FIG. 6, according to an example implementation.

FIG. 19 illustrates a flowchart of functions for use with the method 600 shown in FIG. 6, according to an example implementation. In particular, FIG. 19 illustrates block 640, which includes a further function of detecting, that the adhesive 154 fills the bond cavity 134, via a fill sensor 164/166 disposed at least partially in the semi-permeable breather material 140. For example, detecting that the adhesive 154 fills the bond cavity 134 via the fill sensor 164/166 can include using a sensor selected from the group consisting of a radio frequency identification (RFID) tag configured to modulate frequency response based on the adhesive 154 contacting the RFID tag, a piezo electric sensor configured to change a response as the adhesive 154 moves toward the piezo electric sensor and based on the adhesive 154 contacting the piezo electric sensor, a capacitive sensor configured to respond to adjacent sealant, and a resistive sensor configured to respond to adhesive wetting and resultant resistivity changes by contact.

Figure 20:
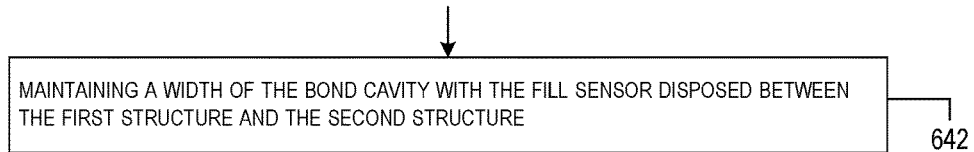
FIG. 20 illustrates a flowchart of functions for use with the method shown in FIG. 6, according to an example implementation.

FIG. 20 illustrates a flowchart of functions for use with the method 600 shown in FIG. 6, according to an example implementation. In particular, FIG. 20 illustrates block 642, which includes a further function of maintaining a width of the bond cavity 134 with the fill sensor 164/166 disposed between the first structure 120 and the second structure 122.

Using example methods and systems described herein can enable creation of bonded structures that have improved strength and higher quality. For instance, the example methods and systems described herein can enable creation of voidfree bondlines in pi joints and single shear joints in aircraft. This results from de-aerated adhesive injected into an evacuated bond cavity so that no or reduced voids are included in the resulting bondline.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of joining a first structure and a second structure, the method comprising:
    forming a bond cavity between a first structure and a second structure;
    placing a semi-permeable breather material at one or more exits of the bond cavity;
    placing perforated adhesive tape over the semi-permeable breather material to allow vacuum through and to block flow of adhesive;
    placing a vacuum bag around the bond cavity and the semi-permeable breather material;
    evacuating the bond cavity via a vacuum port and forcing the adhesive into the bond cavity via an adhesive port while the bond cavity is evacuated; and curing the adhesive via one or more heaters to bond the first structure to the second structure.

2. The method of claim 1, further comprising:
filling the bond cavity with the adhesive such that the adhesive contacts the semi-permeable breather material.

3. The method of claim 2, further comprising:
after filling the bond cavity, discontinue evacuating the bond cavity via the vacuum port.

4. The method of claim 2, wherein curing the adhesive comprises curing the adhesive after filling the bond cavity.

5. The method of claim 1, further comprising:
detecting, that the adhesive fills the bond cavity, via a fill sensor disposed at least partially in the semi-permeable breather material.

6. The method of claim 5, wherein detecting, that the adhesive fills the bond cavity, via the fill sensor comprises detecting that the adhesive fills the bond cavity via a sensor selected from the group consisting of a radio frequency identification (RFID) tag configured to modulate frequency response based on the adhesive contacting the RFID tag, a piezo electric sensor configured to change a response as the adhesive moves toward the piezo electric sensor and based on the adhesive contacting the piezo electric sensor, a capacitive sensor configured to respond to adjacent sealant, and a resistive sensor configured to respond to adhesive wetting and resultant resistivity changes by contact.

7. The method of claim 5, further comprising:
maintaining a width of the bond cavity with the fill sensor disposed between the first structure and the second structure.

8. The method of claim 1, wherein forming the bond cavity between the first structure and the second structure comprises forming the bond cavity between a component of a wing of an aircraft and a wing skin of the wing of the aircraft.

9. The method of claim 1, wherein placing the semi-permeable breather material at the one or more exits of the bond cavity comprises:
placing a material selected from the group consisting of foam and rubber at the one or more exits of the bond cavity.

10. The method of claim 1, wherein forcing adhesive into the bond cavity via the adhesive port comprises forcing the adhesive into the bond cavity via the adhesive port included in the first structure.

11. The method of claim 1, wherein forcing adhesive into the bond cavity via the adhesive port comprises forcing de-aerated adhesive into the bond cavity.

12. The method of claim 1, wherein forcing the adhesive into the bond cavity comprises:
inserting an adhesive cartridge containing the adhesive into the adhesive port, wherein the adhesive cartridge includes a dispenser to dispense the adhesive and a frangible seal proximal the dispenser; and
while the bond cavity is evacuated, breaking the frangible seal due to vacuum pressure and drawing the adhesive into the bond cavity.

13. The method of claim 1, wherein forcing the adhesive into the bond cavity comprises:
inserting an adhesive cartridge containing the adhesive into the adhesive port, wherein the adhesive cartridge includes a dispenser to dispense the adhesive and a frangible seal proximal the dispenser; and
applying pressure to the adhesive cartridge to force the adhesive into the bond cavity.

14. The method of claim 1, further comprising:
placing the one or more heaters adjacent to the bond cavity, wherein placing the vacuum bag around the bond cavity and the semi-permeable breather material further comprises placing the vacuum bag around the one or more heaters.

15. The method of claim 1, further comprising:
maintaining a width of the bond cavity with one or more spacers.

16. The method of claim 1, wherein curing the adhesive via the one or more heaters to bond the first structure to the second structure comprises:
positioning a heat blanket adjacent to the bond cavity; and
positioning a permeable breather material over the heat blanket.

17. A method of joining a first structure and a second structure, the method comprising:
forming a bond cavity between a first structure and a second structure;
placing a semi-permeable breather material at one or more exits of the bond cavity;
placing a vacuum bag around the bond cavity and the semi-permeable breather material;
evacuating the bond cavity via a vacuum port and forcing adhesive into the bond cavity via an adhesive port while the bond cavity is evacuated;
detecting, that the adhesive fills the bond cavity, via a fill sensor disposed at least partially in the semi-permeable breather material; and
curing the adhesive via one or more heaters to bond the first structure to the second structure.

18. The method of claim 17, further comprising:
maintaining a width of the bond cavity with the fill sensor disposed between the first structure and the second structure.

19. The method of claim 17, wherein curing the adhesive via the one or more heaters to bond the first structure to the second structure comprises:
positioning a heat blanket adjacent to the bond cavity; and
positioning a permeable breather material over the heat blanket.

20. The method of claim 17, wherein detecting, that the adhesive fills the bond cavity, via the fill sensor comprises detecting that the adhesive fills the bond cavity via a radio frequency identification (RFID) tag configured to modulate frequency response based on the adhesive contacting the RFID tag.

* * * * *